May 20, 1924.

A. BEHM

DEVICE FOR MEASURING VERY SHORT TIME INTERVALS

Filed July 20, 1921

1,494,986

Inventor
Alexander Behm

Patented May 20, 1924.

1,494,986

UNITED STATES PATENT OFFICE.

ALEXANDER BEHM, OF KIEL, GERMANY.

DEVICE FOR MEASURING VERY SHORT TIME INTERVALS.

Application filed July 20, 1921. Serial No. 486,280.

*To all whom it may concern:*

Be it known that I, ALEXANDER BEHM, physicist, a subject of the German Republic, residing at Kiel, Hardenbergstrasse 31, Germany, have invented certain new and useful Improvements in or Relating to a Device for Measuring Very Short Time Intervals (for which I have filed applications in Germany, filed May 31, 1920; Belgium, filed May 25, 1921; France, filed May 20, 1921; Spain, filed May 28, 1921; Sweden, filed May 30, 1921; Norway, filed May 30, 1921; Denmark, filed May 30, 1921; England, filed May 31, 1921; Holland, filed May 28, 1921), of which the following is a specification.

The present invention relates to a device for measuring very short time intervals, for instance in psycho-physical measurements, the determination of the speed of sound in water and the like, in which the use of clockwork is avoided.

According to this invention, there is mounted on a rotatable spindle a fly wheel, an indicating device and an electromagnet armature. The latter is so arranged that when it is attracted by the corresponding electromagnet, a slight angular rotation is imparted to the spindle and a spring cocked during that time. When the circuit of the electromagnet is broken again, the extended spring imparts an impulse to the spindle which rotates in an opposite direction, until it is stopped by a brake. The angle through which the spindle turns indicates the time elapsed between the interruption of the electromagnet circuit, and the application of the brake, and is indicated in a reliable manner even when it is exceedingly small.

The moment of the application of the brake must be very finely regulated. This is preferably done by a suitable relay connection which is adaptable for those cases in which it is desired to measure time intervals, the duration of which is determined by the velocity of sound. It has been already suggested to measure the depth of the sea and other distance by means of sound, by knowing the moment at which a sound is made and observing the interval that elapses between the initial impulse of the sound and its arrival at a known spot. Recording apparatus for such purposes are microphones, and the above mentioned relay connection is more particularly suitable in connection with the same.

The invention is more particularly described with reference to the accompanying drawing in which—

Figure 1:
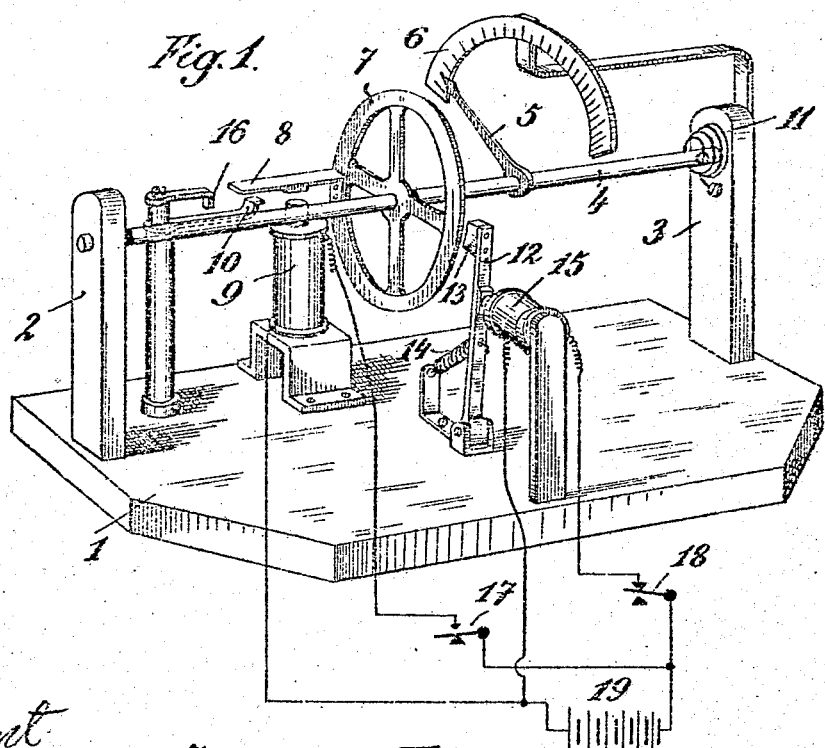

Figure 1 shows the device diagrammatically in perspective view, and

Figure 2:
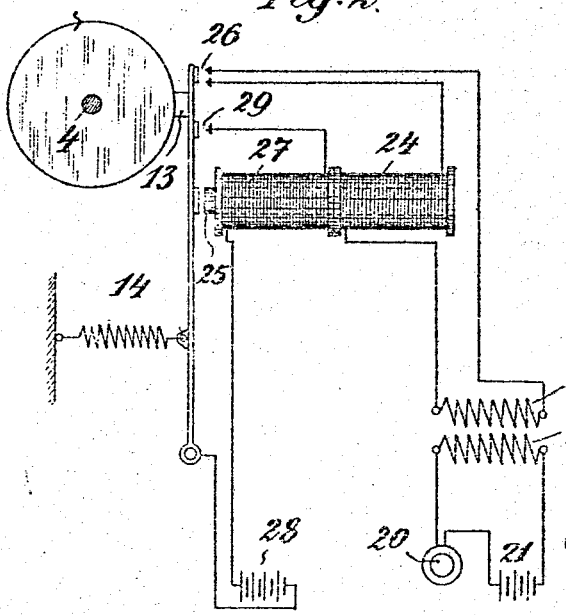

Figure 2 gives the diagram of the relay connection used.

On a bed plate 1 (Figure 1) there is mounted a rotatable spindle 4 carried on the standards 2 and 3. The spindle is provided with a long light index 5 which moves over a scale 6. To the spindle 4 is secured a fly wheel 7 provided with a laterally projecting iron arm 8 which forms the armature of an electromagnet 9 mounted on the bed plate 1. The armature 8 when attracted by the electromagnet 9 depresses a spring 10 secured to the bracket 2, which acts therefore with the pressure imparted to it on the armature 8. The spindle 4 engages a relatively weak torsion spring 11 which tends to bring the spindle 4 into such a position that the hand 5 occupies say the position shown in the drawing, that is to say is not on the zero point of the scale 6. The position of the armature 8 on the fly wheel 7 is calculated so that when the armature is attracted, and the spring 10 depressed, the index 5 indicates zero on the scale.

On the bed plate 1 is also mounted a brake lever 12 which acts by means of a brake block 13 on the fly wheel 7. A spring 14 tends to press the brake block against the fly wheel. When the block 13 engages the fly wheel, the spindle 4 is held stationary. The brake lever 12 is drawn from engagement with the fly wheel upon the energization of the electromagnet 15 which attracts it.

Above the spring 10 is arranged a stop 16 which limits the upward movement of the spring 10 upon the release of the armature 8 from the electromagnet 9. The circuit of the electromagnet 9 is broken by means of a switch 17, and that of the electromagnet 15 by means of a switch 18. The electromagnets are fed by a source of current 19.

The working of the device is as follows: The circuits of the two electromagnets are first closed by the switches 17 and 18. The electromagnet 9 attracts the armature 8, the latter cocks the spring 10 and thus produces a source of power which is subsequently caused to act on the spindle 4. The electromagnet 15 however pulls the brake lever 12 away from the fly wheel 7, and thus leaves the spindle 4 free to rotate. At the beginning of the time interval to be measured, the circuit of the electromagnet 9 is broken at the switch 17. The electromagnet 9 releases accordingly its armature, and the latter, together with the fly wheel 7 and the spindle 4, are driven by the previously cocked spring 10, and consequently the hand 5 moves over the scale. At the end of the time interval to be measured, the circuit of the electromagnet 15 is interrupted by means of the switch 18. At this moment, the brake block is forced against the fly wheel, and the latter as well as the spindle 4, are brought to rest. The length of the time interval which has elapsed between the release of the two switches 17 and 18, will then be indicated by the index 5 on the scale 6.

As may be seen, the spring 11 consumes a part of the energy imparted to the movable system by the spring 10, so that after the circuit of the electromagnet 9 is broken, the said spring is again cocked, as soon as the hand 5 moving with the spindle, has passed beyond its position of rest shown in Figure 1. This has the advantage that the scale 6 need not be divided uniformly in which case the divisions may be closer together towards the end of the scale. The accuracy of the reading is therefore greatest for the shortest time intervals which are in proximity to the zero point. Further, the spring 10 imparts to the movable system an instantaneous initial impulse, as the spring 10 springing upwards is at once stopped by the stop 16, and then the system continues to move due to its own momentum. The magnitude of the impulse exerted by the spring 10 may be regulated in a very exact manner.

The device hereinbefore described is capable of many applications. An important application is for psycho-physical measurements, for ascertaining the so-called personal error. When the signal is given to which the person to be tested has to respond the key 17 is depressed, and thus the hand or index set moving, whilst the person experimented upon, as soon as he responds depresses the key 18. The position which the index assumes on the scale, will indicate the time that has elapsed from the giving of the signal to the moment at which the patient has responded to it.

Another important application is that of measuring the time interval between the arrival at a point of observation of sound waves emitted by a given source on the one hand along a direct path, and on the other hand by an indirect path, for example by reflection. In this case it is advisable to instal microphones which receive the sound waves, and in the circuit of the said microphones are arranged devices by means of which the measuring device is started and stopped. It is important to provide, in the case of reflected sound waves, that the measuring device should be brought to rest upon the arrival of the sound in order that the results are not affected by any temporary interruption of the measuring device due to changes in the strength of the sound or other vibrations. To that end the relay connection diagrammatically shown in Figure 2 is provided. The sound waves are received by a microphone 20 which is placed in the circuit of a battery 21 and in series with the primary coil 22 of an induction coil. The latter acts on a secondary coil 23 which is in the circuit with the winding 24 of an electromagnet having an iron core 25. The circuit of the electromagnet 24 may be broken at 26 and may be closed by an armature 12 being attracted by the electromagnet core 25.

The electromagnet core 25 has also a second winding 27. The latter is in the circuit with a battery 28 and the circuit may be broken at the contact 29 which may be closed by the attraction of the armature 12. The combined magnet 24—27 replaces in the modification, the magnet 15 illustrated in Fig. 1. When the electromagnet armature 12 is brought into the contact position either by hand or otherwise, the circuits of the electromagnet coils 24 and 27 are closed. The coil 24 is not at first energized. But the coil 27 will energize with sufficient strength to hold the armature in an attracted position. The spring 14 is calculated accordingly; so that it is slightly weaker than the magnetic attraction exercised by the coil 27. When the relay connection is used as shown, in combination with the device shown in Figure 1, the armature 12 will correspond to the brake lever and the spring 14 to the similarly marked spring which applies the brake. Accordingly there must be mounted on the armature 12 of Figure 2 a brake block 13 which acts on the fly wheel 7.

In the circuit of the coil 24 induced electric impulses are produced due to the vibrations of the microphone 20 which vary the strength of current in the primary coil 22. The object of the device is to apply the brake block 13 and thereby to stop the movement of the fly wheel 7 and the spindle 4 as soon as the reflected sound waves arrive at the microphone 20. The latter is thereby so affected that the strength of current in the circuit of the battery 21 is increased, and owing to that an induction impulse of a given direction is produced in the secondary coil 23. The direction of winding of the coil 24 is such that the magnetizing of the core 25, produced by such an induction impulse acts in opposition to the magnetizing produced in the coil 27 and thus weakens the total magnetic strength in such a manner that the spring 14 becomes preponderating and pulls off the armature. The success of the connection can be easily seen: when the diaphragm of the microphone oscillates so that a current impulse of opposite direction would be produced in the secondary coil, it is no longer produced, as the circuit of the secondary coil is broken at 26. The result of the observation is not affected because the first sound waves arriving at the microphone have caused the electromagnet armature 12 to be released, and thus the spindle 4 is brought to rest.

It has been found that the accuracy attained with this simple instrument is quite as efficient, as the well known recording methods in which the oscillations of a tuning fork are recorded between certain time intervals.

What I claim is:

1. In an arrangement of the class described, an indicator, spring means for displacing said indicator, electromagnetic means for tensioning said spring means and means for arresting the movement of said indicator, said spring means functioning when said electromagnetic means is de-energized.

2. In a device of the class described a rotatable indicator, means for displacing said indicator, an electromagnet means for tensioning the indicator displacing means, a brake for arresting the movement of said indicator and a circuit including said electromagnet and provided with a switch whereby said electromagnet may be de-energized to permit a movement of said indicator.

3. In a device for measuring short time intervals, a rotatably mounted shaft, an indicator rotatable with said shaft, a spring for displacing said indicator, an electromagnet for tensioning said spring, a second spring connected to said shaft for counteracting a portion of the inertia of said shaft when the indicator is displaced, said second spring returning said shaft after the operation of said indicator to its original position whereby said electromagnet can again tension said spring.

4. In a device for measuring short intervals of time, a rotatable indicator, spring means for moving said indicator in its measuring direction, electrically operated means for tensioning said spring, a brake for arresting the movement of said indicator and an electromagnetic relay provided with a pair of coils for controlling said brake, one of said coils exercising a magnetizing and the other a demagnetizing action.

5. In a device of the class described a measuring indicator, spring means for displacing said indicator, means for tensioning said spring, a brake for arresting the movement of said indicator, an electromagnet relay having two coils for controlling said brake, a microphone arranged in circuit with a primary coil, one of said electromagnetic coils being arranged in circuit with said secondary coil, said electromagnetic coils producing counteracting effects whereby when an induction impulse corresponding to the arrival of a sound wave at the microphone is produced the electromagnetic coils are energized and the brake applied.

6. In an arrangement of the class described a measuring indicator, spring means for displacing said indicator in the measuring direction, means for tensioning said indicator displacing means, a brake for arresting the movement of said indicator, said brake being mounted on an armature, spring means influencing said armature to apply said brake, an electromagnet provided with two windings for holding said brake in off position, a microphone having in circuit therewith a primary coil, one of the windings of said electromagnet being arranged in circuit with said secondary coil and provided with a break closed when said armature is attracted by said electromagnet, an induction impulse corresponding to the arrival of a sound wave at the microphone causing a release of said armature and an application of the brake, this movement of the armature breaking said circuit whereby the microphone circuit can produce only one induction impulse in said electromagnetic winding.

The foregoing specification signed at Kiel this fourteenth day of June, 1921.

ALEXANDER BEHM.

In presence of—
M. CHRISTIANSEN,
P. WOLSSTELLOR.